(12) United States Patent
Kuo et al.

(10) Patent No.: US 8,869,790 B2
(45) Date of Patent: Oct. 28, 2014

(54) FLAT HOLLOW TUBE SOLAR COLLECTOR

(75) Inventors: Dah-Chyi Kuo, Kunshan (CN); Hung-Ping Hsieh, Kunshan (CN); Xue-Hai Wang, Kunshan (CN); Ling Long, Kunshan (CN)

(73) Assignee: Kunshan Jue-Chung Electronics Co., Ltd., Jiangsu (CN)

( * ) Notice: Subject to any disclaimer, the term of this patent is extended or adjusted under 35 U.S.C. 154(b) by 279 days.

(21) Appl. No.: 13/489,924

(22) Filed: Jun. 6, 2012

(65) Prior Publication Data
US 2013/0327318 A1   Dec. 12, 2013

(51) Int. Cl.
*F24J 2/24*   (2006.01)
(52) U.S. Cl.
USPC ............................ 126/651; 126/663; 126/664
(58) Field of Classification Search
USPC ........................ 126/651, 663, 664, 666, 668
See application file for complete search history.

(56) References Cited

U.S. PATENT DOCUMENTS

2010/0206300 A1*   8/2010   Shabtay et al. ............... 126/663

* cited by examiner

*Primary Examiner* — Alfred Basichas
(74) *Attorney, Agent, or Firm* — Chun-Ming Shih; HDLS IPR Services

(57) ABSTRACT

A flat evacuated-tube solar collector includes two parallel collecting tubes, a plurality of parallel evacuated tubes perpendicularly installed between two collecting tubes. Each evacuated tube includes two distal tube sections and a middle section situated between the two distal tube sections, and the middle section is in a flat shape, and has a cross-sectional area greater than that of the distal tube sections. The flat evacuated tubes substitute the conventional fins soldered onto a flat panel solar collector to receive sunlight, while the characteristic of two distal ends of the evacuated tube having a smaller cross-section than the middle section maintains an appropriate spacing between the collecting tube and a connecting point of the evacuated tube to assure the structural strength of the collecting tube.

7 Claims, 10 Drawing Sheets

FLAT HOLLOW TUBE SOLAR COLLECTOR

FIELD OF THE INVENTION

The present invention relates to a solar collector, in particular to a flat evacuated-tube solar collector having evacuated tubes with a cross-section at the middle section greater than the cross-section at distal sections.

BACKGROUND OF THE INVENTION

With reference to FIG. 1, a solar collector is a device capable of heating a working fluid by sunlight, and the solar collector generally comprises a plurality of parallel evacuated tubes 10, two collecting tubes 20/30 coupled perpendicular to both ends of each evacuated tube 10 respectively, and the evacuated tubes 10 are provided for receiving sunlight. In general, a metal fin 40 is soldered to each evacuated tube 20/30, or a fin 40 is soldered between two evacuated tubes 20/30, and a working fluid at room temperature is entered from one of collecting tubes 30 and then diverted to each of the evacuated tubes 10 for exchanging heat with the evacuated tubes 10, and finally exited from another collecting tube 20.

However, the conventional flat panel solar collector still has the following drawbacks. The thermal resistance at a contact between the fin 40 and the evacuated tube 10 is very large, and thus affecting the thermal conductivity adversely. In addition, the fin 40 is very thin, so that a significant drop of thermal conducting efficiency of the fin 40 usually occurs at both linear ends of the fin 40 in contact with the evacuated tube 10, so that the wider the fin 40, the smaller is the heat transfer of the evacuated tube 10 per unit area of the fin 40. In present existing structural designs, the only improvement that can be made is to increase the number of evacuated tubes 10 in order to decrease the spacing between the evacuated tubes 10, and thus decreasing the width of the fin 40 to enhance the thermal conducting efficiency of the fin 40. However, such improvement still cannot overcome the problem of a large heat resistance at the contact between the fin 40 and the evacuated tube 10.

SUMMARY OF THE INVENTION

Therefore, it is a primary objective of the present invention to overcome the aforementioned problem by providing a flat evacuated-tube solar collector, characterized in that the evacuated tube has a middle section substantially in a flat shape, and the middle section has a cross-section greater than the cross-section of the distal tube sections of the evacuated tube. The flat shaped middle section receives sunlight by a maximum heat receiving area. Since the two distal tube sections have a cross-section smaller than that of the middle section, the evacuated tubes arranged adjacent to one another will not increase the number of connecting points between a collecting tube and the evacuated tubes. On the other hand, the invention guarantees an appropriate spacing between the connecting points to assure the structural strength of the collecting tube.

To achieve the aforementioned objective, the present invention provides a flat evacuated-tube solar collector, comprising two collecting tubes and a plurality of evacuated tubes. The two collecting tubes are arranged in parallel to each other, and each of the collecting tube includes a plurality of connecting portions arranged parallel to one another and installed between the two collecting tubes, and each evacuated tube includes two distal tube sections and a flat middle section situated between the two distal tube sections, and the two distal tube sections of each evacuated tube are interconnected to one of the connecting portions of each collecting tube.

Preferably, the flat evacuated-tube solar collector further comprises a seal structure installed between the connecting portion and the distal tube section interconnected to the connecting portion.

Preferably, the seal structure is formed between the connecting portion and the distal tube section interconnected to the connecting portion by soldering.

Preferably, the seal structure of the flat evacuated-tube solar collector includes a locking device and a baffle plate disposed at the distal tube section, and the locking device is movably sheathed on the distal tube section, and the baffle plate is disposed between the locking device and the connecting portion and abutted against the locking device, and the connecting portion includes a screw thread formed on an inner side of the connecting portion, and the locking device is secured to the screw thread to compress the baffle plate to forcibly seal the distal tube section and the connecting portion.

Preferably, the baffle plate of the flat evacuated-tube solar collector abuts an inner side of the connecting portion.

Preferably, the seal structure of the flat evacuated-tube solar collector includes a gasket installed between the distal tube section and the connecting portion.

Preferably, the baffle plate of the flat evacuated-tube solar collector abuts the gasket.

Preferably, the middle section of each evacuated tube of the flat evacuated-tube solar collector has a cross-section substantially in a flat shape.

Preferably, the evacuated tube of the flat evacuated-tube solar collector is installed perpendicular to the collecting tube.

Compared with the conventional flat panel water heater, the flat evacuated-tube solar collector of the present invention adopts a structural design with a flat middle section of the evacuated tube and a greater cross-section of the middle section than the cross-section of the distal tube section to overcome the problems of a high resistance of the soldered structure of the fin and the evacuated tubes, a decreasing thermal conducting effect as the distance between the fin and the evacuated tube increases, and an substantial increase of the weight of the flat evacuated-tube solar collector

DESCRIPTION OF THE PREFERRED EMBODIMENTS

The details and technical contents of the present invention will become apparent with the description of the following preferred embodiments accompanied with the illustration of the related drawings as follows. However, the drawings are provided for the purpose of illustrating the present invention only, but not intended for limiting the scope of the invention.

Figure 1:
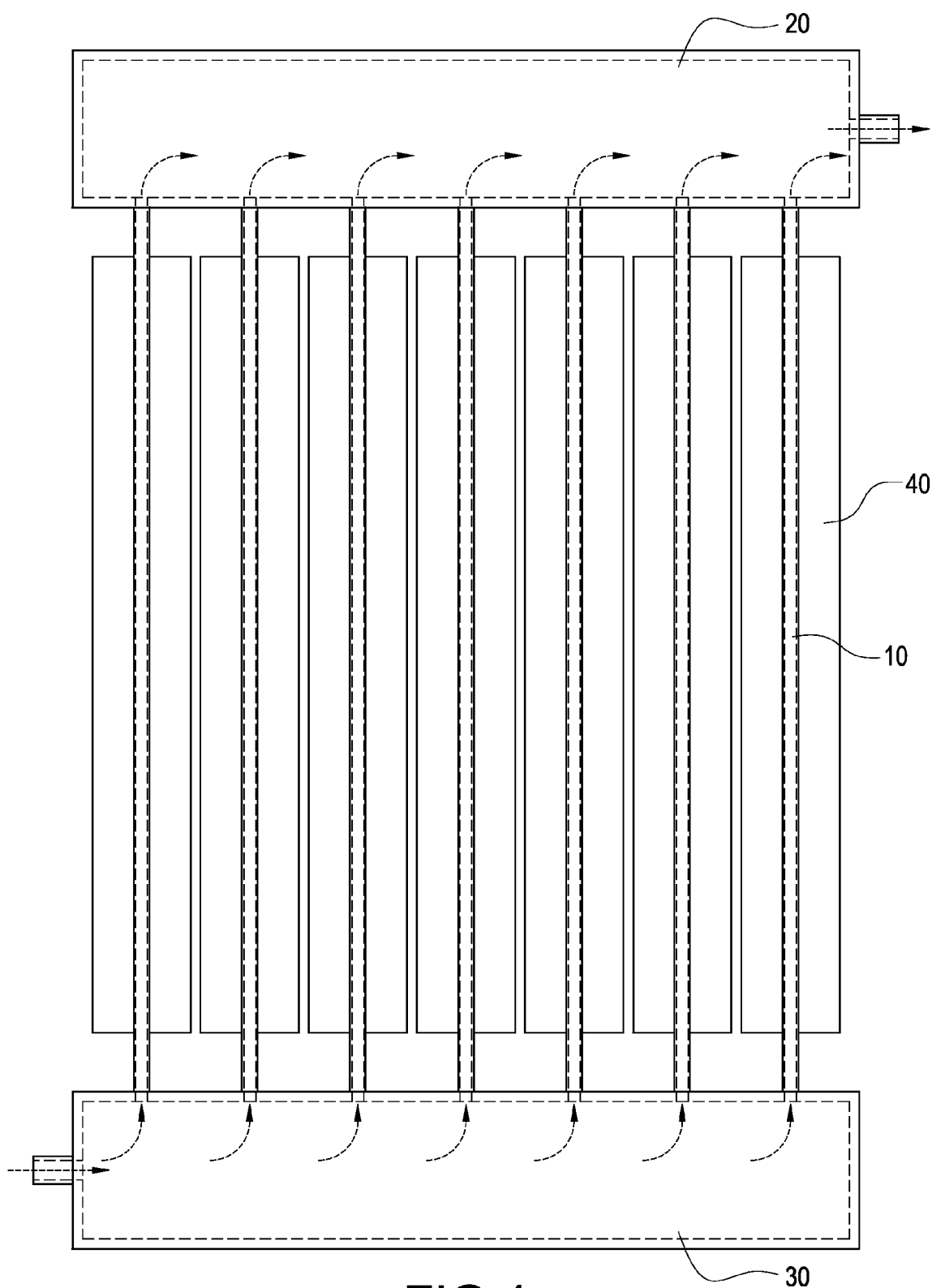
FIG. 1 is a schematic view of a conventional solar collector.
Figure 2:
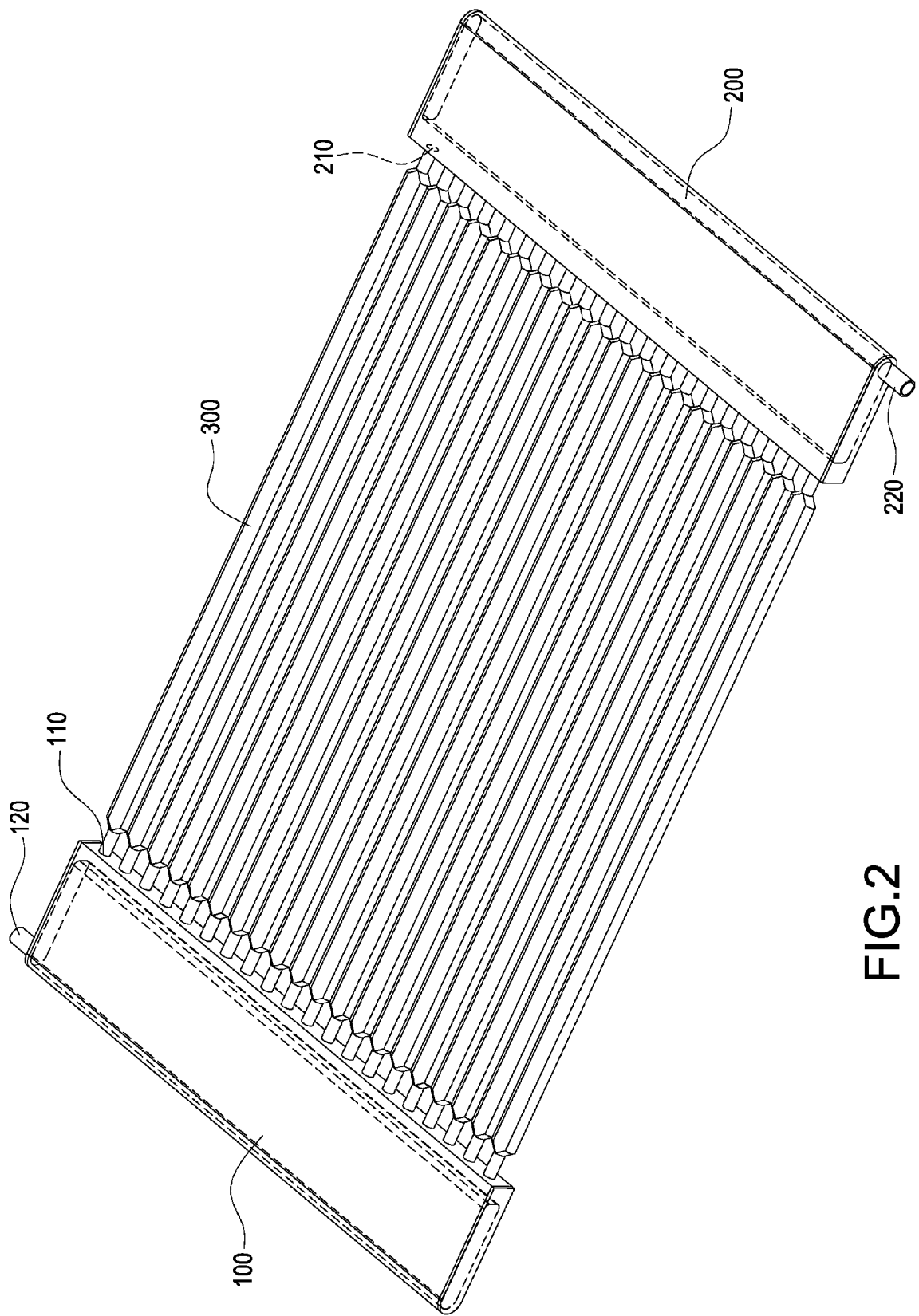
FIG. 2 is a perspective view of a flat evacuated-tube solar collector in accordance with a first preferred embodiment of the present invention.

With reference to FIG. 2 for a perspective view of a flat evacuated-tube solar collector in accordance with the first preferred embodiment of the present invention, the flat evacuated-tube solar collector comprises two collecting tubes 100, 200 and a plurality of evacuated tubes 300.

Figure 3:
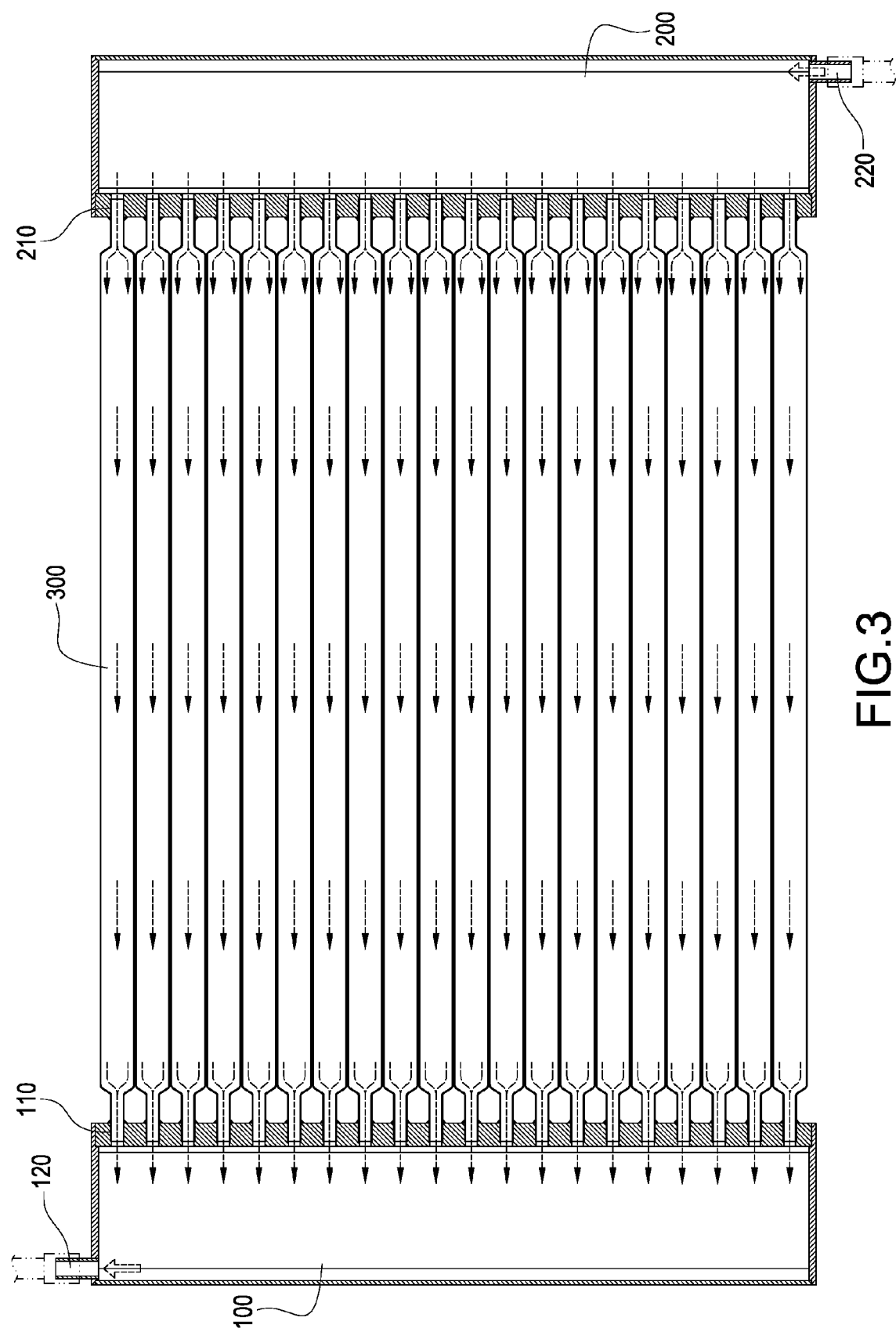
FIG. 3 is a schematic view of an operation state of a flat evacuated-tube solar collector in accordance with the first preferred embodiment of the present invention.

With reference to FIGS. 2 and 3, the collecting tubes 100, 200 are preferably made of metal and hollow, and the two collecting tubes 100, 200 are installed parallel to each other, and each collecting tube 100, 200 has an opening 120, 220 and a plurality of connecting portions 110, 210, wherein the opening 120, 220 is provided for filling a working fluid into the flat evacuated-tube solar collector of the present invention. In this preferred embodiment, the working fluid is entered from the opening 220 of one of the collecting tubes 200 into the flat evacuated-tube solar collector of the present invention, and then heated, and finally discharged from the opening 120 of another collecting tube 100 to a liquid container. The connecting portions 110, 210 are arranged in a central-axis direction of the collecting tubes 100, 200 and disposed on a tube wall of each collecting tube 100, 200, and preferably disposed opposite to each other and on the connecting portions 110/210 of two collecting tubes 100, 200 respectively.

Figure 4:
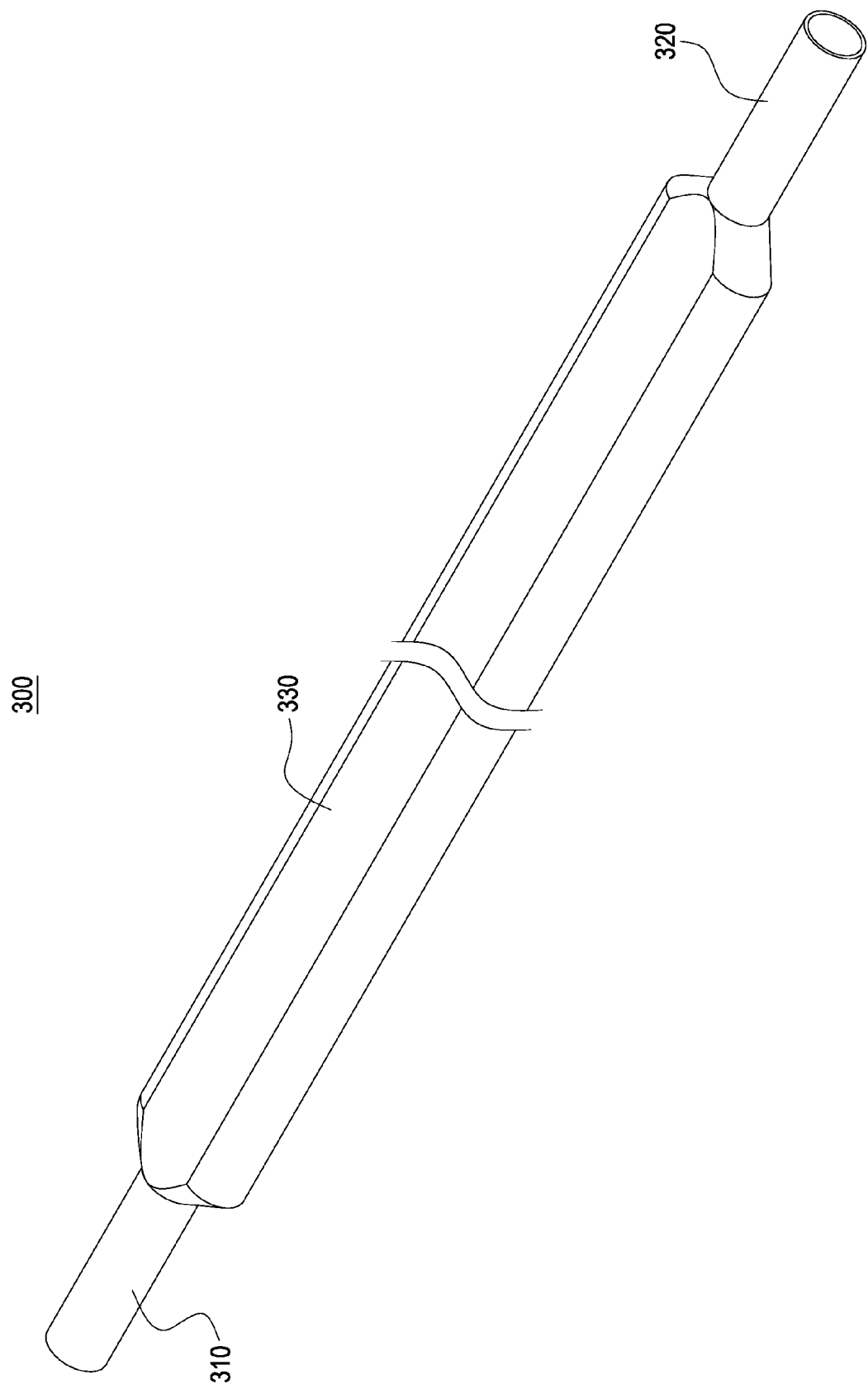
FIG. 4 is a schematic view of an evacuated tube in accordance with the first preferred embodiment of the present invention.
Figure 5:
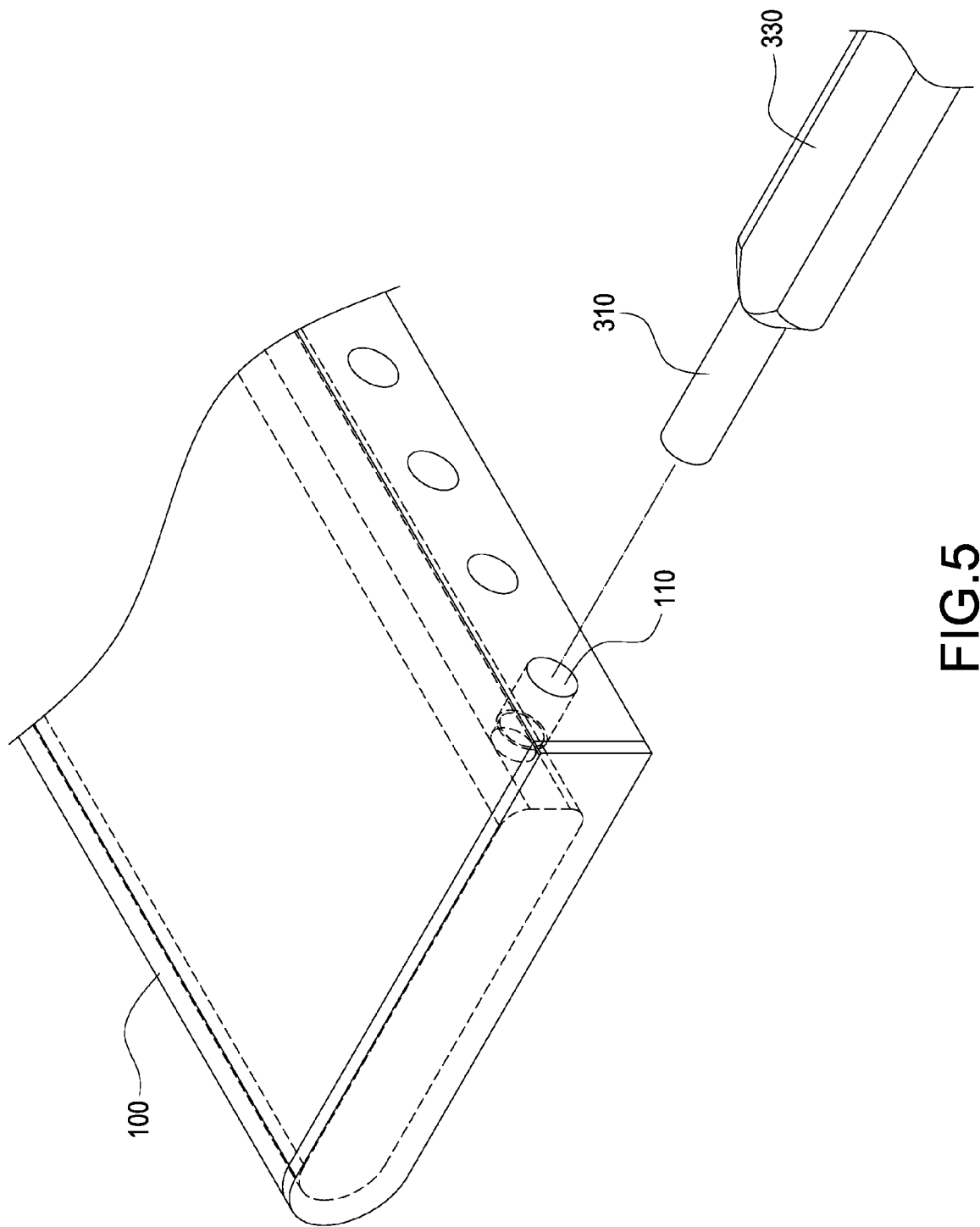
FIG. 5 is a schematic view of a distal tube section of an evacuated tube and a connecting portion of a collecting tube in accordance with the first preferred embodiment of the present invention.

With reference to FIGS. 2, 4 and 5, each evacuated tube 300 is a hollow tube, preferably made of metal, and both ends of the evacuated tube 300 are connected perpendicular to the two collecting tubes 100, 200 respectively, and the plurality of evacuated tubes 300 are parallel to each other and disposed between the two collecting tubes 100, 200. Each evacuated tube 300 has two distal tube sections 310, 320 and a middle section 330, and the two distal tube sections 310, 320 are situated at both ends of each evacuated tube 300 respectively, and the middle section 330 is situated between the two distal tube sections 310, 320. The middle section 330 has a cross-section substantially in a flat shape, and the distal tube section 310, 320 has a cross-section smaller than that of the middle section. Preferably, the distal tube section 310, 320 has a circular cross-section in a central-axis direction perpendicular to the evacuated tube, and the middle section 330 has a flat shaped (or elliptical shaped) cross-section perpendicular to the central-axis direction of the evacuated tube, and the long-axis direction of the elliptical shape is parallel to an aligning direction of the evacuated tube 300 (which is the central-axis direction of the collecting tube 100, 200). The structure of the evacuated tube 300 can be a metal tube which is a shrink tube disposed at a distal tube section 310, 320, and the middle section 330 has a cross-section greater than that of the distal tube section 310, 320, and the middle section 330 is compressed flatly to form the flat evacuated tube 300. One of the distal tube sections 310 of each evacuated tube 300 is interconnected to a connecting portion 110 of one of the collecting tubes 100, and another distal tube section 320 is interconnected to another connecting portion 210 of another collecting tube 200, such that both ends of the evacuated tube 300 are interconnected perpendicular to the two collecting tubes 100, 200 respectively, and the plurality of evacuated tubes 300 are arranged in parallel to each other to achieve a maximum sunlight receiving area.

In this preferred embodiment, a seal structure is formed between the distal tube section 310 and the connecting portion 110 preferably by soldering to maintain the tightness between the distal tube section 310 and the connecting portion 110.

Figure 6:
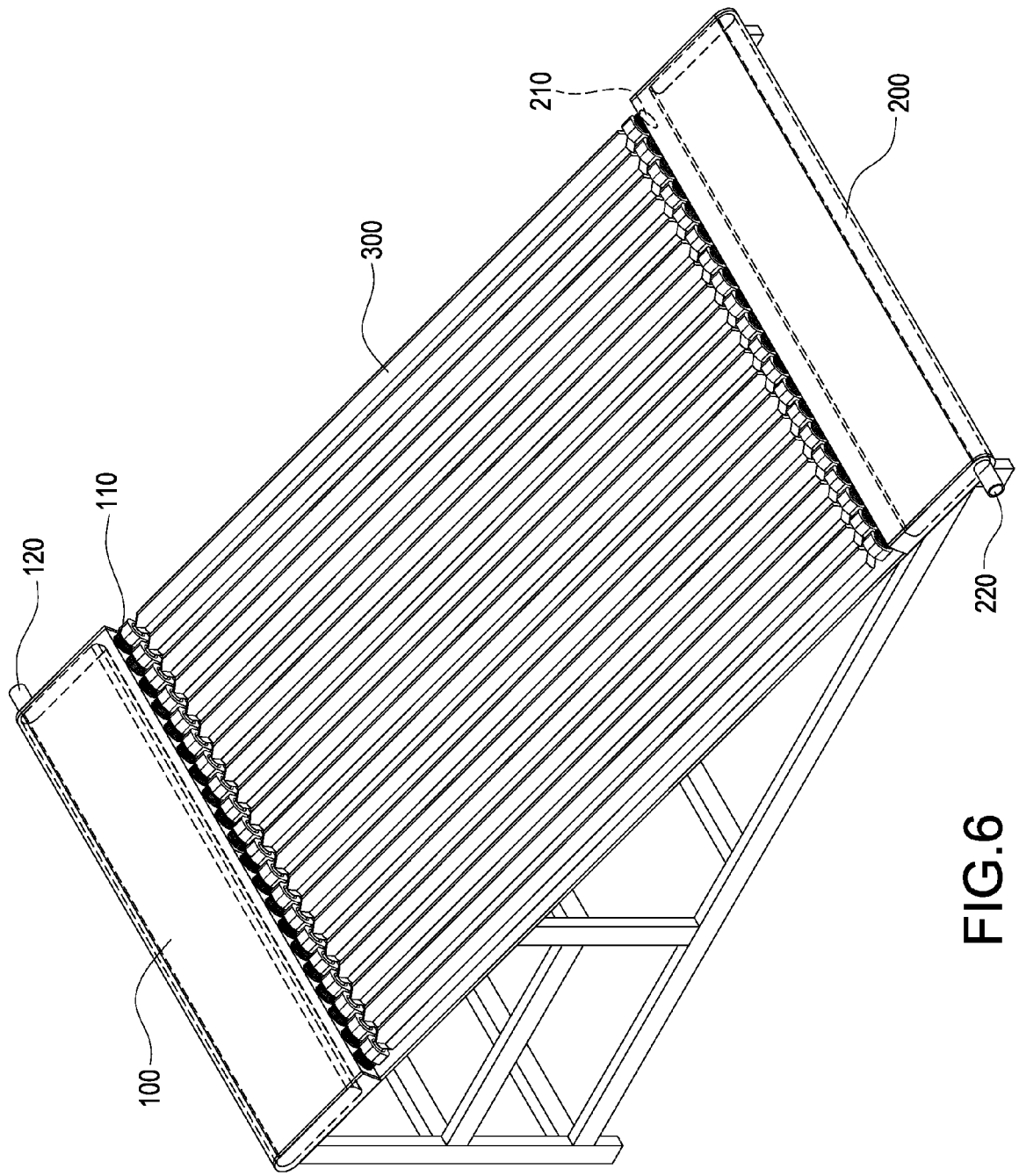
FIG. 6 is a perspective view of a flat evacuated-tube solar collector, showing the internal structure and appearance of the solar collector in accordance with a second preferred embodiment of the present invention.
Figure 7:
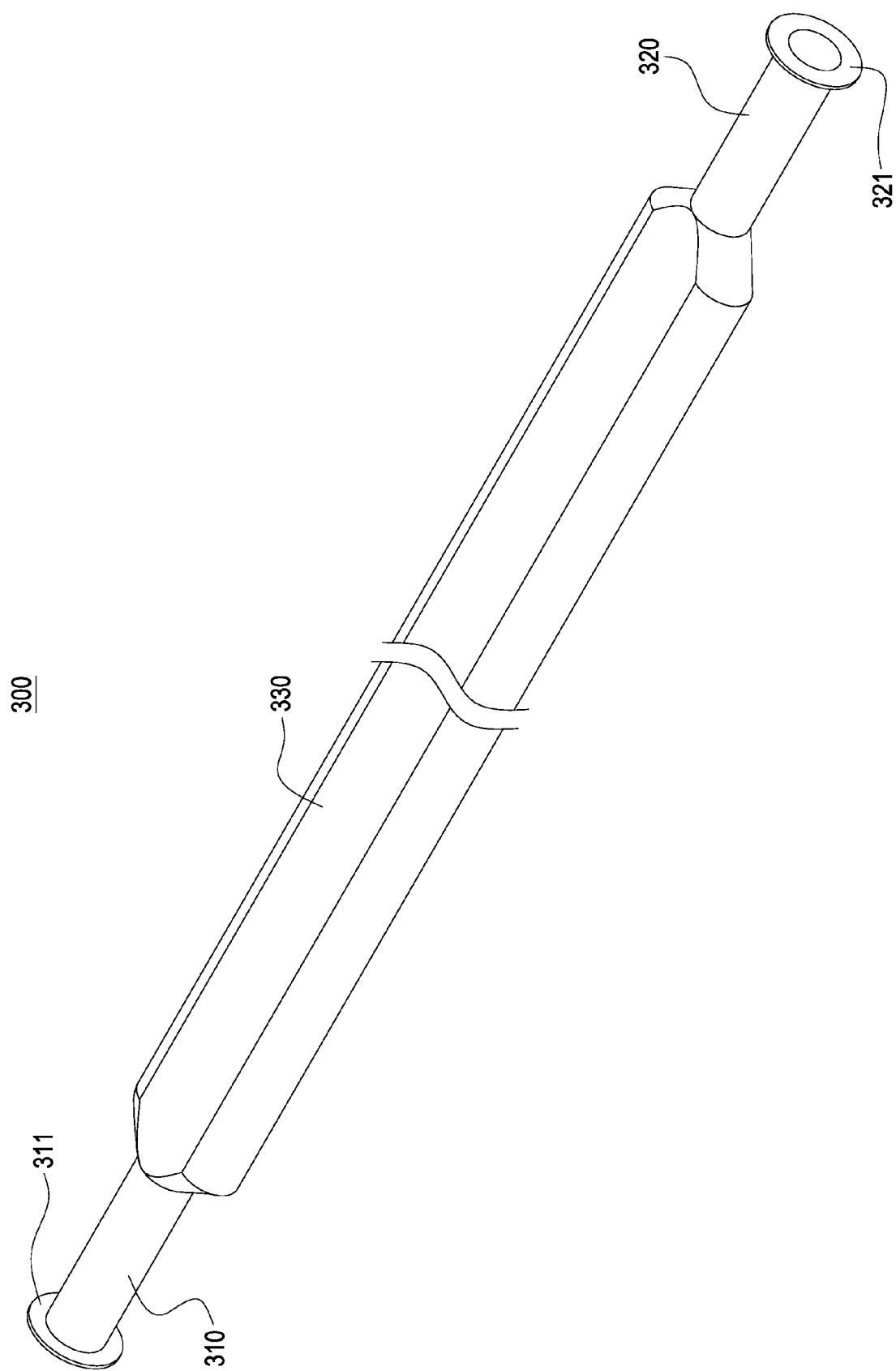
FIG. 7 is a schematic view of an evacuated tube in accordance with the second preferred embodiment of the present invention.

With reference to FIGS. 6 and 7 for a flat evacuated-tube solar collector in accordance with the second preferred embodiment of the present invention, the flat evacuated-tube solar collector comprises two collecting tubes 100, 200, a plurality of evacuated tubes 300, a plurality of seal structures and a gasket 500. The structure and connecting relation of the collecting tube 100, 200 and the evacuated tube 300 are the same as those of the first preferred embodiment, and thus will not be repeated. The difference between the second preferred embodiment and the first preferred embodiment resides on that the seal structure is installed between the connecting portion 110, 210 and the distal tube section 310, 320, and the seal structure includes a locking device 400 and a baffle plate 311, 321 installed at the distal tube section 310, 320.

With reference to FIG. 7, each distal tube section 310, 320 has a baffle plate 311, 321 installed thereon. Preferably, the baffle plate 311, 321 is integrally formed at an opening at an end of the distal tube section 310, 320, but the present invention is not limited such arrangement only. In this preferred embodiment, the baffle plate 311, 321 is extended axially outward from the opening at an end of the distal tube section 310, 320 and installed around the opening at an end of the distal tube section 310, 320.

Figure 8:
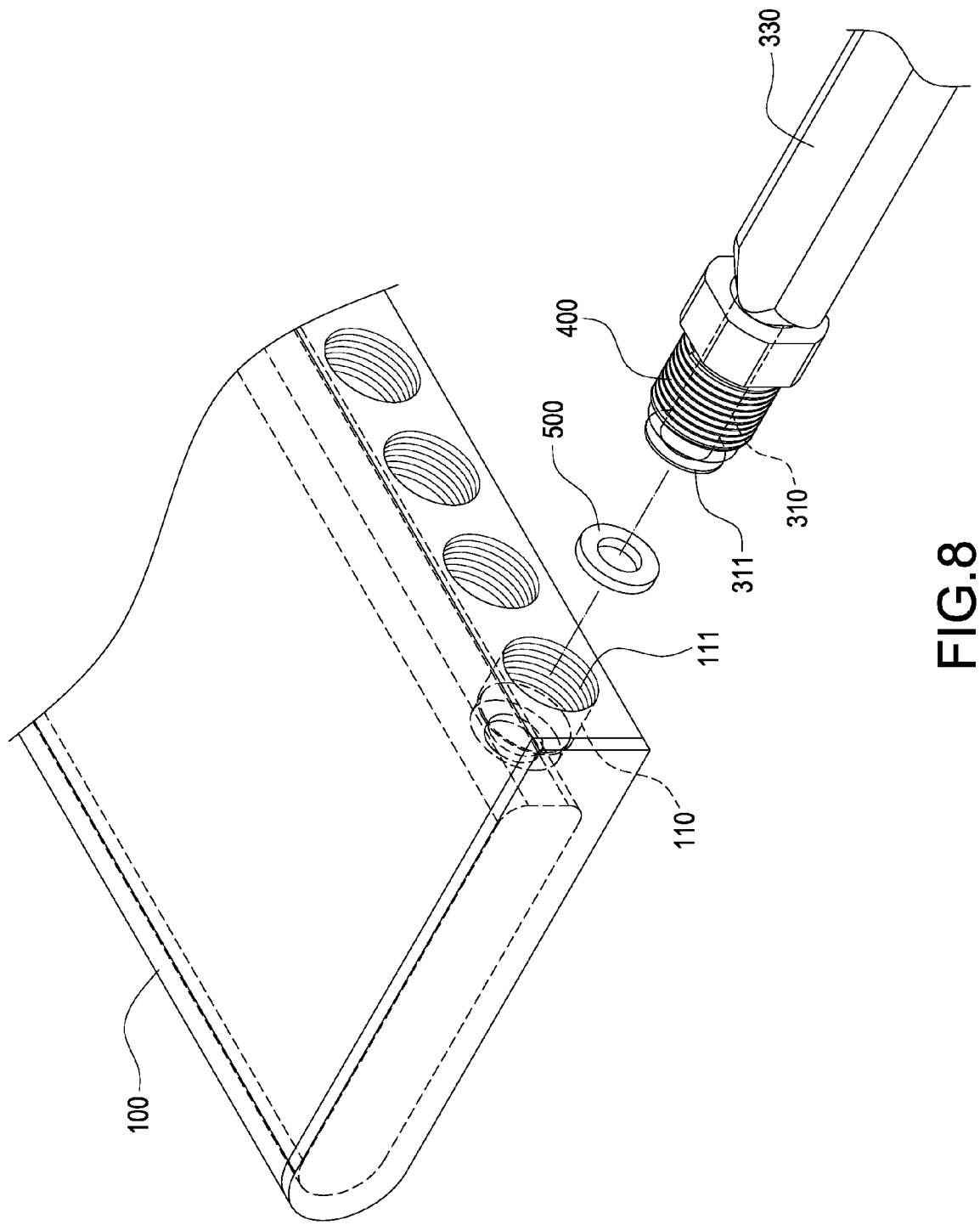
FIG. 8 is a schematic view of a seal structure in accordance with the second preferred embodiment of the present invention.
Figure 9:
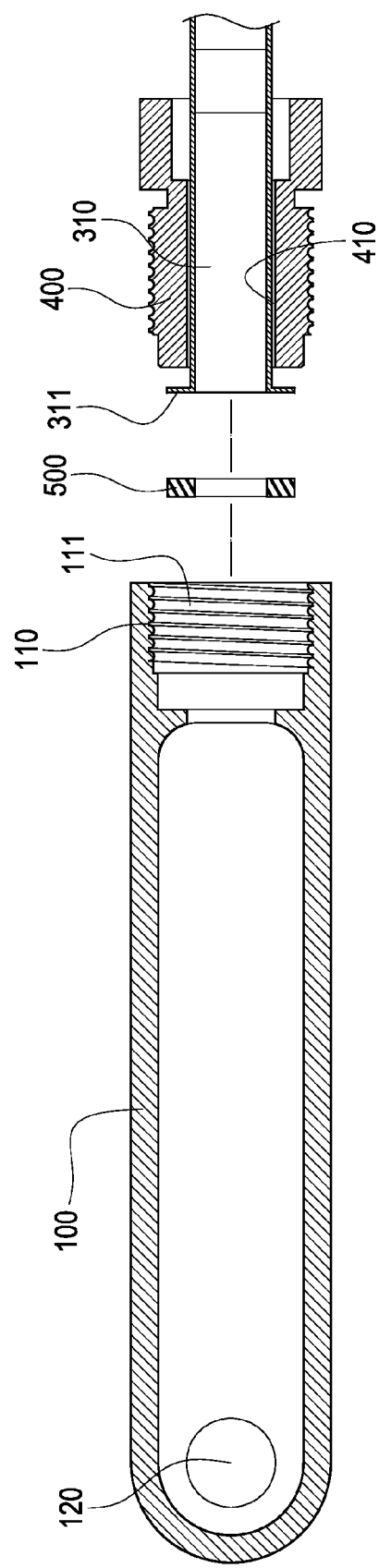
FIG. 9 is a cross-sectional view of a seal structure in accordance with the second preferred embodiment of the present invention.
Figure 10:
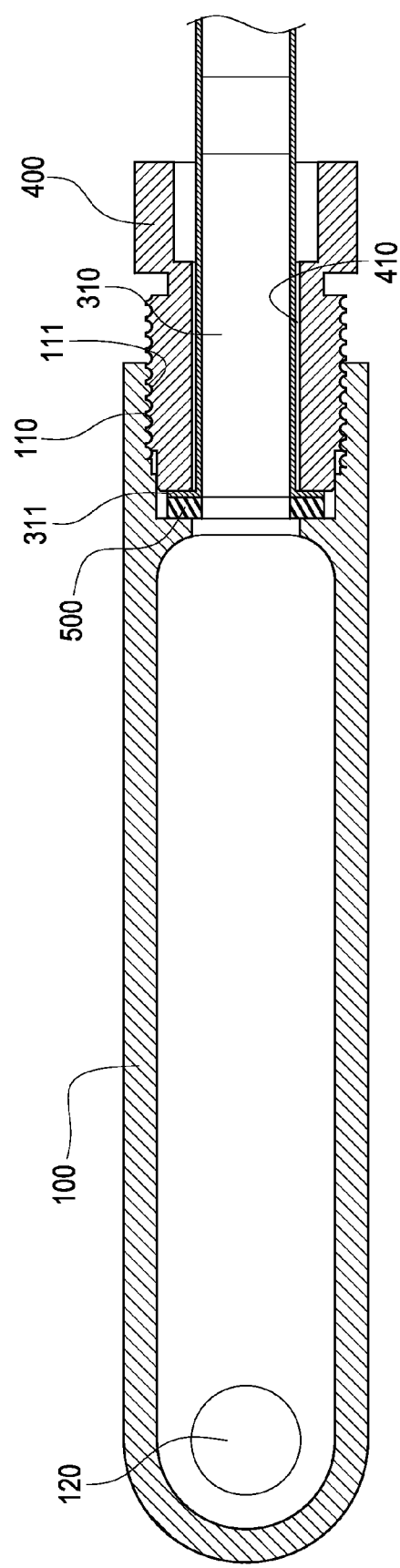
FIG. 10 is a cross-sectional view of a seal structure in accordance with the second preferred embodiment of the present invention.

With reference to FIGS. 8 to 10, the locking device 400 is preferably in the shape of a hollow screw, and the locking device 400 has a sheathing hole 410 axially formed and penetrated through the locking device 400. Preferably, the sheathing hole 410 is slightly greater than the external diameter of the distal tube section 310 and smaller than the external periphery of the baffle plate 311, and the distal tube section 310 is passed through the sheathing hole 410, such that the locking device 400 can be movably sheathed on the distal tube section 310 and abutted against the baffle plate 311. The connecting portion 110 of the collecting tube 100 has a screw thread 111 formed on an inner side of the connecting portion 110, and the locking device 400 is secured to the screw thread 111. The baffle plate 311 is installed between the locking device 400 and the connecting portion 110, so that when the locking device 400 is secured to the screw thread 111, the baffle plate 311 is compressed to forcibly seal the distal tube section 310 and the connecting portion 110. The gasket 500 is installed between the distal tube section 310 and the connecting portion 110. In this preferred embodiment, the baffle plate 311 is situated at an opening at an end of the distal tube section 310 and abutted against the gasket 500, such that when the locking device 400 compresses the baffle plate 311, the opening at an end of the distal tube section 310 and the baffle plate 311 will compress the gasket 500 to enhance the tightness between the distal tube section 310 and the connecting portion 110.

In the flat evacuated-tube solar collector of the present invention, the flat shaped middle section 330 of the evacuated tube 300 and the cross-section of the middle section 330 being greater than the cross-section of the distal tube section 310, 320 assure that a reasonable spacing is maintained at each connecting point between each evacuated tube 300 and the collecting tube, and a maximum light receiving area can be obtained without requiring the structure of the fin. In addition, the evacuated tube 300 of the present invention adopts the conventional soldering method to connect the collecting tube 100, 200, or a locking method to seal the collecting tube 100, 200 and the evacuated tube 300 or interconnect the evacuated tube with the collecting tube 100, 200.

While the invention has been described by means of specific embodiments, numerous modifications and variations could be made thereto by those skilled in the art without departing from the scope and spirit of the invention set forth in the claims.

What is claimed is:

1. A flat hollow tube solar collector, comprising:
two collecting tubes, installed parallel to each other, and each of the collecting tubes having a plurality of connecting portions;
a plurality of flat hollow tubes, arranged parallel to one another and installed between two collecting tubes, and each of the hollow tubes having two distal tube sections and a middle section situated between the two distal tube sections, and the middle section having a cross-section greater than the cross-section of the two distal tube sections, and the two distal tube sections of each the hollow tube being interconnected with one of the connecting portions of each collecting tube; and
a seal structure installed between the connecting portion and the distal tube section interconnected to the connecting portion,
wherein the seal structure includes a locking device and a baffle plate disposed at the distal tube section, and the locking device is movably sheathed on the distal tube section, and the baffle plate is disposed between the locking device and the connecting portion and abutted against the locking device, and the connecting portion includes a screw thread formed on an inner side of the connecting portion, and the locking device is secured to the screw thread to compress the baffle plate to forcibly seal the distal tube section and the connecting portion.

2. The solar collector of claim 1, wherein the seal structure is formed between the connecting portion and the distal tube section interconnected to the connecting portion by soldering.

3. The solar collector of claim 1, wherein the baffle plate abuts an inner side of the connecting portion.

4. The solar collector of claim 1, wherein the seal structure includes a gasket installed between the distal tube section and the connecting portion.

5. The solar collector of claim 4, wherein the baffle plate abuts the gasket.

6. The solar collector of claim 1, wherein the middle section of each hollow tube has a cross-section substantially in a flat shape.

7. The solar collector of claim 1, wherein the hollow tubes are arranged perpendicular to the collecting tubes respectively.

* * * * *